United States Patent [19]

Lagow et al.

[11] Patent Number: 4,827,042

[45] Date of Patent: May 2, 1989

[54] PERFLUOROPOLYETHERS

[75] Inventors: Richard J. Lagow, Georgetown; Thomas R. Bierschenk; Timothy J. Juhlke, both of Roundrock, all of Tex.

[73] Assignee: ExFluor Research Corporation, Austin, Tex.

[21] Appl. No.: 92,228

[22] Filed: Sep. 2, 1987

Related U.S. Application Data

[63] Continuation-in-part of Ser. No. 796,622, Nov. 8, 1985, abandoned.

[51] Int. Cl.$^4$ .................... C07C 43/30; C07C 43/313
[52] U.S. Cl. .................................. 568/603; 568/601; 568/604
[58] Field of Search ....................... 568/601, 603, 604

[56] References Cited

U.S. PATENT DOCUMENTS 3,665,041 5/1972 Sianesi et al. .

OTHER PUBLICATIONS

Gerhardt and Lagow, J. Chem. Soc., Perkin Trans, I, 1321, (1981).
Lagow and Margrave, Progress in Organic Chemistry, 26:161.

Primary Examiner—Howard T. Mars
Attorney, Agent, or Firm—Hamilton, Brook, Smith & Reynolds

[57] ABSTRACT

Perfluoropolyethers containing high concentrations of difluoromethylene oxide units in the polymer chain are disclosed.

3 Claims, No Drawings

PERFLUOROPOLYETHERS

RELATED APPLICATIONS

This application is a continuation-in-part application of application Ser. No. 796,622 filed Nov. 8, 1985, abandoned.

FIELD OF THE INVENTION

This invention is in the fields of polymer and fluorine chemistry.

BACKGROUND OF THE INVENTION

Perfluoropolyethers have long been recognized for their outstanding thermal properties and their wide liquid ranges. These properties render them useful as hydraulic fluids, heat exchange fluids and lubricants. For many applications, it is desirable to have a fluid with very good low temperature properties (e.g. low pour points) as well as good high temperature stability. It is recognized in the art that one way of extending the low temperature liquid range of a fluid is the incorporation of methylene oxide units in the polymer. The low energy of activation for rotation about a carbon-oxygen bond gives the fluid added mobility at low temperatures. Unfortunately, typical vinyl polymerization techniques such as those used to make polytetrafluoroethylene oxide and polyhexafluoropropylene oxide (DuPont Krytox TM) cannot be used to make a difluoromethylene oxide containing polymer.

Sianesi and coworkers describe the synthesis of polymers of the general formulae $CF_3$—O—$(CF_2$—O$)_n$—$CF_2$—C(O)F, $CF_3$—(O—$CF_2)_n$—$CF_2$—C(O)F and $CF_3$—(O—$CF_2)_n$ —O—C(O)F. See French Patent Nos. 1,531,902 and 1,545,639. The polymeric mixture was obtained by reacting difluorocarbene (generated in situ by the pyrolysis of hexafluoropropene) with molecular oxygen. Although the polymers contain reactive end groups such as acyl fluoride and fluoroformate groups which limit their stability, the polymers represented a major breakthrough.

Gerhardt and Lagow describe the synthesis of perfluoropolyethylene oxide by direct fluorination. *J. Chem. Soc., Perkin Trans. I,* 1321 (1981). The authors also report the formation of a partially fluorinated polymer obtained in low yield when polymethylene oxide (polyformaldehyde) was slowly reacted with dilute elemental fluorine at $-78°$ C.

DISCLOSURE OF THE INVENTION

This invention pertains to perfluoropolyethers which contain high concentrations of difluoromethylene oxide units in the polymer chain and which are capped with unreactive trifluoromethyl terminal groups and to method of producing such perfluoropolyethers. The perfluoroethers which can be produced by the method of this invention have a chain structure consisting essentially of repeating units —$OCF_2$— and —OY—, wherein Y is selected from —$CF_2$—, —$CF_2CF_2$—, —$CF_2CF_2CF_2$—, —$CF(CF_3)CF_2$—, —$CF_2CF_2CF_2CF_2$—, —$CF(C_2F_5)CF_2$, —$CF_2CF_2$—O—$CF_2CF_2$— and —$CF_2CF(CF_2Cl)$—, the repeating units being randomly distributed along the chain, the ratio of —$OCF_2$— units to —OY— units being greater than 1 and less than about 100. The perfluoropolyethers have perfluoroalkyl end groups. The perfluoropolyethers have a molecular weight from about 300 to about 50,000 atomic mass units. The polymers include homopolymers containing essentially 100% difluoromethylene oxide units (i.e. perfluoropolymethylene oxide) and copolymers containing difluoromethylene oxide units to tetrafluoro-ethylene oxide, perfluoropropylene oxide or perfluorobutylene oxide units in a ratio of from about 100 down to just greater than 1. The polymers range in molecular weight from about 300 to about 50,000 amu. The higher molecular weight polymers are solids; the lower molecular weight polymers are fluids. The polymers contain a hydrogen content below 5 ppm and can be prepared in 20 to 90% yield depending on the composition of the polymer being fluorinated. The polymers are synthesized by perfluorinating, preferably in the presence of a hydrogen fluoride scavenger such as sodium fluoride, polymers which contain at least one ethylene oxide, diethylene oxide, propylene oxide, butylene oxide or epichlorohydrin for every 100 methylene oxide units along the polymer chain.

Novel perfluoropolyethers which can be produced by the method of this invention are represented by the formula:

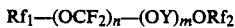

wherein Y can be —$CF_2CF_2CF_2$, —$CF_2CF_2CF_2CF_2$—, —$CF(C_2F_5)CF_2$—, —$CF_2CF_2OCF_2CF_2$—, or —$CF_2CF(CF_2Cl)$—; wherein $Rf_1$ and $Rf_2$ may be the same or different and are selected from $CF_3$, $C_2F_5$, $C_3F_7$, $C_4F_9$, $C_2F_4Cl$ and $C_3F_6Cl$ and wherein n is an integer greater than 1 and m is an integer equal to or greater than 1 such that the ratio n/m is from greater than 1 but less than about 100. The repeat units ($OCF_2$) and (OY) are randomly distributed in the polymer chain. The perfluoropolyether fluids of this invention are useful as hydraulic fluids, as heat transfer media or as bases for high performance greases which require fluids having a wide liquid range. The perfluoropolyether solids are useful as moldable elastomers or grease fillers. In addition, the solid polymers can be broken down, for example, by pyrolysis at 600° C., to produce low molecular weight fluids.

BEST MODE OF CARRYING OUT THE INVENTION

The perfluoropolyethers which can be produced by the method of this invention comprise the homopolymer perfluoropolymethylene oxide and perfluorinated copolymers of methylene oxide and either ethylene oxide, diethylene oxide, propylene oxide, butylene oxide or epichlorohydrin wherein the ratio of methylene oxide units to ethylene oxide, diethylene oxide, propylene oxide, butylene or epichlorohydrin oxide ranges from greater than 1 and less than about 100. The perfluoropolyethers are defined by the formula:

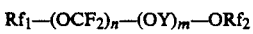

wherein Y is —$CF_2$—, —$CF_2CF_2$—, $CF_2CF_2CF_2$—, —$CF(CF_3)CF_2$—, —$CF_2CF_2CF_2CF_2$—, —$CF(C_2F_5)CF_2$—, —$CF_2CF_2OCF_2CF_2$— or —$CF_2CF(CF_2Cl)$—; wherein $Rf_1$ and $Rf_2$ may be the same or different and are selected from $CF_3$, $C_2F_5$, $C_3F_7$, $C_4F_9$, $C_2F_4Cl$ and $C_3F_6Cl$ and wherein n is an integer greater than 1 and m may be 0 or an integer equal to or greater than 1 such that the ratio of n/m is greater than 1 but less than about 100. The polymers range from about 300 to about 50,000 amu in size, the high molecular weight polymer being solids and the intermediate and lower molecular weight polymer being fluids. The polymers contain no reactive perfluoroalkyl end groups. Compounds wherein Y is $CF_2CF_2CF_2$—$CF_2CF_2CF_2CF_2$—, —$CF(C_2F_5)CF_2$—, —$CF_2CF_2OCF_2CF_2$—, and —$CF_2CF(CF_2Cl)$— are new structures.

The perfluoropolyethers are synthesized by selecting or synthesizing a starting hydrocarbon polyether which contains methylene oxide units and the desired amount of ethylene oxide, diethylene oxide, propylene oxide, butylene oxide, epichlorohydrin units and subsequently perfluorinating the polymer under controlled conditions, preferably in the presence of a sodium fluoride scavenger such as sodium fluoride or potassium fluoride. The hydrocarbon starting material must have at least one ethylene oxide, propylene oxide or butylene oxide unit for about every one hundred methylene oxide units along the polymer chain.

The type of perfluoropolymer product, and its molecular weight, depend on the composition of starting hydrocarbon polyether and the fluorination conditions. The hydrocarbon starting material can be selected from commercially available polymers such as CELCON TM (Celanese Corp.) which contains about a 55/1 ratio of methylene oxide units to ethylene oxide units. Alternatively, the starting polymers can be synthesized. Ethylene oxide-methylene oxide copolymers can be prepared with the desired ratio of comonomers by polymerization of 1,3-dioxolane/trioxane mixtures using a trifluoromethane sulfonic acid catalyst. Polymers of methylene oxide and propylene oxide or butylene oxide can be prepared for fluorination. For example, polymerization of trioxane and 4-methyl-1, 3-dioxolane gives a copolymer of methylene oxide and propylene oxide. Similarly, copolymers of methylene oxide and diethylene oxide can be made by copolymerizing trioxane with 1,3,6, trioxocane.

The conditions of fluorination are important to the ultimate product. High fluorine concentrations, fast flow rates and elevated temperatures each favor fragmentation, and thus lower molecular weight products can be obtained. Milder fluorination conditions designed to prevent fragmentation give stable high molecular weight perfluoropolyethers.

Although a variety of fluorinating agents such as $ClF_3$ and $BrF_3$ could be used to fluorinate the hydrocarbon polymer, elemental fluorine is the reagent of choice. Typically, low fluorine concentrations between one and ten percent are used initially. Upon approaching perfluorination, the polymer is exposed to pure fluorine first at room temperature then at 100° C. The best results are obtained when a hydrogen fluoride scavenger, such as sodium fluoride, is placed in the fluorination reactor along with the polymer. The fluorination of ethers in the presence of hydrogen scavengers is described in U.S. patent application Ser. No. 796,623, entitled "Perfluorination of Ethers in the Presence of Hydrogen Fluoride Scavengers", filed concurrently, the teachings of which are incorporated by reference herein.

When mild fluorination conditions are used to fluorinate a high molecular weight polymer (greater than 10,000 amu), a white solid is typically obtained. Several schemes can be employed to prepare intermediate molecular weight fluids. Perfluorination of a low molecular weight polymer using mild fluorination conditions works well. Treating a higher molecular weight polymer with slightly harsher fluorination conditions can lead to fluids when the conditions are chosen to give a controlled amount of chain cleavage. "Perfluorination" of a high molecular weight polymer using mild conditions can be used to replace a specified number of hydrogens with fluorine. A second step, the fragmentation step, is designed to promote chain cleavage. Elevated temperatures and high fluorine concentrations are used to give the perfluoropolyether fluid.

An alternate scheme, and possibly the method of choice for preparing a wide range of molecular weights involves the fluorination of high molecular weight polymer using mild fluorination conditions to give a high molecular weight solid containing both perfluoro alkyl and acyl fluoride end groups. Treatment of the polymer with pure fluorine at elevated temperatures (100° C.) gives a polymer containing only perfluoro alkyl end groups. The high molecular weight solids can be broken down to lower molecular weight components by pyrolysis. The procedure is described in U.S. patent application Ser. No. 796,624 entitled "The Pyrolysis of Perfluoropolyethers", the teachings of which are incorporated by reference. Thereafter, pyrolysis of the solid in the presence of nitrogen, air or fluorine gives lower molecular weight polymers (fluids). By selecting the proper pyrolysis temperature (400°–500° C.) and by carrying out the pyrolysis in a distillation-type apparatus, a well defined boiling point range can be collected while less volatile components are returned to the high temperature portion of the apparatus to be further fragmented. If the pyrolysis is not carried out in the presence of fluorine, an additional fluorination at elevated temperature is needed to remove the acyl fluoride terminal groups generated during the cracking.

For preparation of difluoromethylene oxide, inclusion of the 2-4 carbon comonomer in the starting hydrocarbon polymer is believed to prevent depolymerization of the polymer during the fluorination procedure. For example, when pure, high molecular weight polymethylene oxide is fluorinated, no perfluoropolymethylene oxide is obtained. Carbonyl fluoride is made instead. The reasons for this is that when a high molecular weight polymer (greater than 10,000 amu) is fluorinated, the likelihood of breaking at least one carbon-oxygen bond along the polymer chain in the course of fluorination is essentially 100%. When bond cleavage occurs, the polymer is believed to depolymerize or "unzip" giving rise to carbonyl fluoride as the sole product.

By randomly incorporating at least one ethylene oxide for every 100 methylene oxide units, perfluoromethylene oxide yields in the 20 to 30% range can be obtained. The ethylene oxide unit is thought to provide a point of termination for the "unzipping" reaction. The ethylene oxide also provides a stable trifluoromethyl terminal group for the polymer. By doubling the molar concentration of ethylene oxide from 2% to 4%, the yield of perfluoropolymer is increased from 40% to 60%. Slightly higher concentrations give increasingly higher yields of perfluoromethylene oxide.

A preferred method of elemental fluorination for production of perfluoropolymethylene oxide is as follows. The starting hydrocarbon polyether is ground to a fine powder and mixed with powdered sodium fluoride (approximately 5/1 (w/w) ratio of NaF to polymer). The blend is dried under a stream of inert gas (e.g. nitrogen). The blend is then exposed to a stream of fluorine gas diluted with an inert gas (nitrogen or helium). This initial fluorine concentration should be about 1% with a fluorine flow rate of about 1 cc/min/gram polymer. The temperature is held at 0° C. These conditions are maintained for about 2 days after which the inert gas concentration is reduced by 50% to give a 2% fluorine content. After about 6 hours, fluorine concentration is raised to 10%. Over a period of 48-56 hours, fluorine concentration can be raised stepwise until the pure fluorine conditions are attained. The pure fluorine stream is maintained for about 4 hours to give a perfluorinated product. The product is then cooled. The product can be removed from NaF by dissolution in Freon 113.

The perfluoropolyether fluids of this invention have several distinct advantages over the existing fluids, namely Fomblin Z TM fluids. Polymers can be prepared which contain essentially 100% methylene oxide units instead of 50–60% methylene units which is typical of the Italian product. These polymers exhibit far superior low temperature properties and have viscosities which are extremely independent of temperature. Low pour points are needed for many cryogenic and space applications.

The invention is further illustrated by the following examples.

EXAMPLE 1

Production of Perfluoropolymethylene oxide 200 grams of high molecular weight (10,000) polymethylene oxide which contains four mole percent ethylene oxide was prepared by copolymerizing 1,3,5-trioxane (2.8 mole) and 1,3-dioxolane (0.3 mole) using a trifluoromethane sulfonic acid catalyst ($2.6 \times 10^{-3}$ mole). The finely divided powder obtained was dried at room temperature for 12 hours using a stream of nitrogen gas. The powder was mixed with 1,000 grams of NaF powder in a conical shaped nickel reactor which was rotated at a frequency of 5 revolutions per minute. After purging the reactor with 4 L/min. nitrogen for several hours, the fluorine was set a 200 cc/min while the nitrogen flow was set a 5 L/min. After 48 hours, the nitrogen flow was reduced to 2.5 L/min. and was kept there for an additional 6 hours before exposing the polymer to pure fluorine. Following exposure of the polymer to pure fluorine for several hours at ambient temperature, the polymer was reacted with fluorine at 100° C. to decarboxylate any acyl fluoride end groups to give trifluoromethyl terminated groups. Typically, a flow of 50 cc/min. of pure fluorine for 6 hours is sufficient to remove all of the unwanted end groups. The perfluoro product was separated from the NaF/NaHF$_2$ powder by dissolving the NaF in water. Approximately 210 grams of a solid white was obtained.

Approximately 75 g of a medium viscosity oil was extracted from the solid with freon 113 solvent. The fluid was characterized by $^{19}$F NMR. Each of the individual spectral lines were assigned a structure by comparison with the spectra of known perfluoro compounds. Spectral data for the fluid is given in the table below.

TABLE 1

| Structure | Chemical Shift (ppm) | Relative Intensity |
|---|---|---|
| —OCF$_2$CF$_2$OCF$_2$OCF$_2$CF$_2$O— | — | — |
| —OCF$_2$OCF$_2$OCF$_2$CF$_2$O— | 55.1 | 7.3 |
| —OCF$_2$OCF$_2$OCF$_2$O— | 57.0 | 73.0 |
| CF$_3$OCF$_2$O— | 57.4 | 7.3 |

TABLE 1-continued

| Structure | Chemical Shift (ppm) | Relative Intensity |
|---|---|---|
| CF$_3$OCF$_2$O— | 59.7 | 11.8 |
| —OCF$_2$CF$_2$OCF$_2$CF$_2$O— | 90.7 | 1.4 |
| —OCF$_2$OCF$_2$CF$_2$O— | 92.5 | 2.8 |

On the basis of the NMR Spectroscopic analysis, the fluid was determined to be polydifluoromethylene oxide containing approximately 2 mole percent tetrafluoroethylene oxide.

EXAMPLE 2

200 g of high molecular weight (10,000) poly(ethylene oxide-methylene oxide) copolymer which contained fourteen mole percent ethylene oxide was prepared in a manner similar to that used for preparing the polymer of Example 1. 1,3-dioxolane (0.6 mole) is mixed with trioxane (1.75 moles) in a methylene chloride solvent. A white precipitate forms upon adding the trifluoromethane sulfonic acid catalyst ($2.6 \times 10^{-3}$ mole) The finely divided powder obtained was dried at room temperature for twelve hours using a stream of nitrogen. The powder was mixed with 100 g of NaF powder in a conical shaped nickel reactor which was rotated at a frequency of five revolutions per minute. The polymer was fluorinated using conditions identical to those employed for the fluorination of the polymethylene oxide polymer containing four mole percent ethylene oxide (Example 1). Approximately 260 grams of white elastomeric solid was obtained upon dissolving the sodium fluoride/bifluoride in water.

Extraction of the solid with freon 113 gave 95 g of a freon soluble oil which was characterized by $^{19}$F NMR as above.

TABLE 2

| Structure | Chemical Shift (ppm) | Relative Intensity |
|---|---|---|
| —OCF$_2$CF$_2$OCF$_2$OCF$_2$CF$_2$O— | 53.8 | 2.9 |
| —OCF$_2$OCF$_2$OCF$_2$CF$_2$O— | 55.3 | 8.3 |
| —OCF$_2$OCF$_2$OCF$_2$O— | 56.8 | 54.1 |
| CF$_3$OCF$_2$O— | 57.5 | 9.5 |
| CF$_3$OCF$_2$O— | 59.8 | 12.4 |
| —OCF$_2$CF$_2$OCF$_2$CF$_2$O— | 91.0 | 1.2 |
| —OCF$_2$OCF$_2$CF$_2$O— | 92.7 | 8.3 |

Based upon the NMR Spectrum, the fluid was determined to be a copolymer of difluoromethylene oxide (DFMO) and tetrafluoroethylene (TFEO) oxide in which the molar ratio DFMO to TFEO units was essentially the same as the molar ratio of the methylene to ethylene units in the starting polymer (94/6 based upon $^{19}$F NMR). Distillation of the product yielded the following fractions: a fraction (20.1 g) boiling between 150 and 210° C. at 100 mm Hg and having a pour point of −133° C. and an ASTM slope of 0.72; a second fraction (18.0 g) boiling between 210° C. at 100 mm Hg and 223° C. at 15 mm Hg having a pour point of −120° C. and an ASTM slope of 0.63; a third fraction (19.3 g) boiling between 223° C. at 15 mm Hg and 275° C. at 100 Hg having a pour point of −115° C. and an ASTM slope of 0.55; a fourth fraction (15.3 g) boiling between 275° C. and 335° C. at 60 Hg having a pour point of −112° C. and an ASTM slope of 0.43 and a residue (22.2 g) having a pour point of −107° C. and an ASTM slope of 0.36.

EXAMPLE 3

20 g of a high molecular weight (20,000) poly(ethylene oxide-methylene oxide) copolymer containing 0.5 mole percent ethylene oxide was mixed with 140 g of NaF powder and loaded in a small fluorination reactor. The reactor was cooled to −20° C. and a gas flow of 20 cc/min fluorine and 100 cc/min nitrogen was maintained for 24 hours. Next, the temperature was raised to 0° C. while the gas flows were held at their initial settings for an additional 24 hours. The nitrogen flow was then decreased to 50 cc/min with a reactor temperature of +10° C. for 12 hours. Finally, the polymer was treated at room temperature for six hours with pure fluorine. The perfluoro product was separated from the NaF/NaHF$_2$ powder by dissolving the salt in water. Approximately 11 g of a fine white powder was obtained.

EXAMPLE 4

200 g of a high molecular weight polymethylene oxide which contained six mole percent propylene oxide was prepared by copolymerizing 1,3,5-trioxane and 4-methyl-1,3-dioxolane using a trifluoromethane sulfonic acid catalyst. The finely divided powder obtained was dried at room temperature for 12 hours using a stream of nitrogen gas. The powder was mixed with 1,200 g of NaF powder in a conical shaped nickel reactor which was rotated at a frequency of 5 revolutions per minute. After purging the reactor with several volumes of nitrogen, the fluorine flow was set at 200 cc/min while the nitrogen flow was set at 5 L/min. These conditions were maintained for 48 hours (reactor temperature: 0° C.), at which time the nitrogen flow was reduced to 2.5 liters per minute and was kept there for an additional 6 hours before exposing the polymer to pure fluorine. Following exposure of the polymer to pure fluorine for 6 hours at ambient temperature, the polymer was treated with pure fluorine at 110° C. for 4 hours. The reactor products were washed with several gallons of water leaving behind 240 g of a white powder identified by $^{19}$F nmr as a perfluoro(methylene oxide-propylene oxide) copolymer.

EXAMPLE 5

A copolymer of methylene oxide and diethylene glycol was prepared by mixing 200 g of trioxane (2.2 mol) with 130 g trioxocane (1.1 mol) in dry methylene chloride. The solution became viscous over a period of several hours following the addition of a catalytic amount of trifluoromethane sulphonic acid. The viscous solution was stabilizied with the addition of 1 ml of tributyl amine and was coated on 1750 g of finely ground sodium fluoride. The resulting paste was dried in a vacuum oven at 60° C. for 24 hours then weighed to determine the weight of the polymer (1750 g sodium fluoride +173 g of polymers). Fluorination of the powder using the conditions described in Example 2 yielded 270 g of a medium viscosity fluid along with 94 g of a tacky solid polymer. The chemical shifts observed in the $^{19}$F NMR were essentially indistinguishable from the resonances observed for the fluid described in Example 2. However, the relative intensities were different because of the abundance of CF$_2$CF$_2$OCF$_2$CF$_2$O units being present in the polymer.

EXAMPLE 6

25 g of a copolymer of methylene oxide and epichlorohydrin which contained 4% epichlorohydrin was prepared by reacting trioxane with 4-chloromethyl-1,3-dioxolane in a 3:1 molar ratio. A white solid was formed which was ground to a fine powder and mixed with 150 g of 200 mesh sodium fluoride powder. Fluorination of the polymer with 25 cc fluorine diluted with 650 cc/min nitrogen for 48 hours at 0° C. followed by treatment with pure fluorine at 50° C. gave 9.5 g of a fluid and a small amount of an elastomeric solid (less than 1 gram).

Industrial Applicability

The perfluoropolyether fluids of this invention are useful as hydraulic fluids, heat transfer media or as bases for high performance greases which require fluids having a wide liquid range. The solid perfluoropolyethers can be used as elastomers and as fillers for high performance greases.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. Perfluoropolyethers of the formula:

$$R_{f1}-(OCF_2)_n-(OY)_m-OR_{f2}$$

wherein:
the units OCF$_2$ and OY are randomly distributed along the polymer chain;
Y is —CF$_2$CF$_2$CF$_2$—, —CF$_2$CF$_2$CF$_2$CF$_2$—, —CF(C$_2$F$_5$)CF$_2$—, —CF$_2$CF$_2$OCF$_2$CF$_2$— or —CF$_2$CF(CF$_2$Cl)—;
wherein Rf$_1$ and Rf$_2$ may be the same or different and are selected from CF$_3$, C$_2$F$_5$, C$_3$F$_7$, C$_4$F$_9$, C$_2$F$_4$Cl and C$_3$F$_6$Cl;
n an integer greater than 1; and
m is an integer equal or greater than 1 such that the ratio n/m is greater than 1 and less than about 100;
the perfluoropolyethers having a molecular weight from about 300 to about 50,000 atomic mass units.

2. Perfluoropolyethers of claim 1, wherein the ratio n/m is from about 100/1 to about 10/1.

3. A perfluoropolyether having a chain structure consisting essentially of repeating units —OCF$_2$— and —OY— randomly distributed along the chain and of terminal groups selected from the group consisting of CF$_3$, C$_2$F$_5$, C$_3$F$_7$, C$_4$F$_9$, C$_2$F$_4$Cl and C$_3$F$_6$Cl, wherein Y is —CF$_2$CF$_2$CF$_2$—, —CF$_2$CF$_2$CF$_2$CF$_2$—, —CF(C$_2$F$_5$)CF$_2$—, or —CF$_2$CF$_2$OCF$_2$CF$_2$— or —CF$_2$CF(CF$_2$Cl)—, the units being randomly distributed along the chain, the ratio of the number of —OCF$_2$— units to —OY— units being greater than 1 and less than about 100, the perfluoropolyether having a molecular weight from about 300 to about 50,000 atomic mass units.

* * * * *